(12) United States Patent
Vakulenko et al.

(10) Patent No.: US 10,824,700 B2
(45) Date of Patent: Nov. 3, 2020

(54) DEVICE, SYSTEM, AND METHOD OF SELECTIVE ACTIVATION, DEACTIVATION, AND CONFIGURATION OF COMPONENTS

(71) Applicant: ARM LIMITED, Cambridge (GB)

(72) Inventors: Michael Vakulenko, Zichron Yaacov (IL); Nimrod Zimerman, Netanya (IL); Ohad Hageby, Ra'anana (IL); Shira Schweitzer, Ramat HaSharon (IL)

(73) Assignee: ARM LIMITED, Cambridge (GB)

( * ) Notice: Subject to any disclaimer, the term of this patent is extended or adjusted under 35 U.S.C. 154(b) by 216 days.

(21) Appl. No.: 16/052,630

(22) Filed: Aug. 2, 2018

(65) Prior Publication Data

US 2020/0044868 A1     Feb. 6, 2020

(51) Int. Cl.
*G06F 21/30*     (2013.01)

(52) U.S. Cl.
CPC .................. *G06F 21/305* (2013.01)

(58) Field of Classification Search
CPC .................................................. G06F 21/305
See application file for complete search history.

(56) References Cited

U.S. PATENT DOCUMENTS

| | | | | |
|---|---|---|---|---|
| 5,452,339 A * | 9/1995 | Siu | ............................ | G06F 8/71 379/15.03 |
| 5,499,295 A * | 3/1996 | Cooper | ..................... | H04L 9/32 380/270 |
| 5,504,801 A * | 4/1996 | Moser | ....................... | G06F 8/65 379/27.01 |
| 5,715,390 A * | 2/1998 | Hoffman | ............ | G01R 21/1333 726/20 |
| 5,790,662 A * | 8/1998 | Valerij | .................... | G06K 19/16 380/2 |
| 5,883,960 A * | 3/1999 | Maruyama | .......... | H04L 63/0853 380/249 |
| 6,826,690 B1 * | 11/2004 | Hind | ....................... | G06F 21/31 713/173 |
| 2010/0169200 A1 * | 7/2010 | Gomes | .................... | G06Q 40/00 705/35 |
| 2012/0323868 A1 * | 12/2012 | Robbin | ................. | G06F 16/957 707/695 |
| 2013/0117740 A1 * | 5/2013 | Oh | ........................... | G06F 8/654 717/171 |
| 2017/0011365 A1 * | 1/2017 | Fransson | .............. | G06Q 20/322 |
| 2018/0183802 A1 * | 6/2018 | Choyi | ................... | H04L 63/102 |

\* cited by examiner

*Primary Examiner* — Bradley W Holder
(74) *Attorney, Agent, or Firm* — Eitan Mehulal Sadot

(57) ABSTRACT

Device, system, and method of selective activation and configuration of components. A manufactured electronic device includes at least one hardware component which is locked or disabled or deactivated, or is feature-constrained. An end-user of the electronic device utilizes a computerized platform or a cloud-based platform to request activation or upgrade of that hardware component, optionally together with paying a fee for such request. In response to the request, an access token is generated by the manufacturer of the electronic device, with cryptographic elements that indicate to the electronic device that the request is approved and authorized by the manufacturer and also by the relevant vendor or communications carrier. The electronic device validates the access token, and modifies configurational parameters in its secure storage to activate or to upgrade the capabilities of the relevant hardware components of the electronic device.

5 Claims, 2 Drawing Sheets

DEVICE, SYSTEM, AND METHOD OF SELECTIVE ACTIVATION, DEACTIVATION, AND CONFIGURATION OF COMPONENTS

FIELD

Some embodiments relate to the field of electronic devices.

BACKGROUND

Millions of people worldwide utilize smartphones, tablets, laptop computers, desktop computers, and other electronic devices on a daily basis. Users perform various tasks via such devices, for example, browsing the Internet, consuming digital content, sending and receiving electronic mail (Email), engaging in video conference and chat sessions, playing games, listening to music, or the like.

Some manufacturers of electronic devices provide multiple different offerings to consumers, at different prices. For example, a more expensive "flagship" electronic device may comprise a fast quad-core processor and a large memory; whereas a less expensive "entry level" electronic device may comprise a slower single-core processor and a smaller memory.

DETAILED DESCRIPTION

Figure 1:
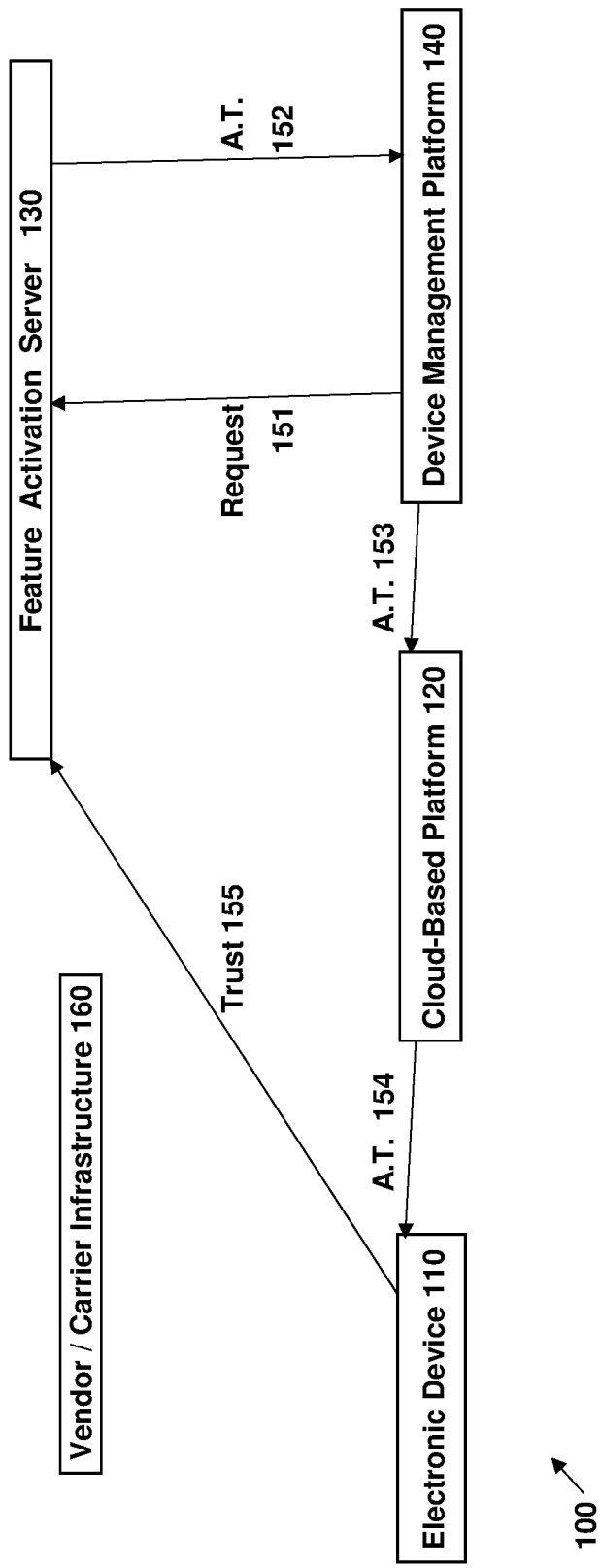
FIG. 1 is a schematic illustration of a system, in accordance with some demonstrative embodiments.

At an overview, discussed herein are devices, systems, and methods of selective activation and configuration of components. For example, a manufactured electronic device includes at least one hardware component which is locked or disabled or deactivated, or is feature-constrained. An end-user of the electronic device utilizes a computerized platform or a cloud-based platform to request activation or upgrade of that hardware component, optionally together with paying a fee for such request. In response to the request, an access token is generated by the manufacturer of the electronic device, with cryptographic elements that indicate to the electronic device that the request is approved and authorized by the manufacturer and also by the relevant vendor or communications carrier. The electronic device validates the access token, and modifies configurational parameters in its secure storage to activate or to upgrade the capabilities of the relevant hardware components of the electronic device.

The Applicants have realized that a manufacturer of electronic devices may wish to achieve price segmentation by providing multiple different offerings to consumers, at different prices. For example, a more expensive "flagship" electronic device may be manufactured to comprise a fast quad-core processor, a large memory, and a 60 frames-per-second (FPS) 1080p camera; whereas a less expensive "entry level" electronic device may comprise a slower single-core processor. a smaller memory, and a 30 FPS 720p camera.

The Applicants have realized that due to manufacturing constraints, marketing constraints, or other consideration, a manufacturer may not be able to efficiently manufacture or market more than a few versions of the same device; for example, ranging from entry-level devices, through average-user devices, to devices targeted to advanced or professional users. Accordingly, the price segmentation and/or the offerings diversity that a manufacturer may be able to achieve may be limited.

The Applicants have realized that it may be possible to enable a manufacturer of an electronic device to manufacture a mass quantity of the same electronic device, comprising the same hardware component; and to enable subsequent or post-sale activation or de-activation (or, subsequent or post-sale enabling or disabling) of hardware component(s) or hardware feature(s) in a selective manner, on a customer-by-customer basis or on a device-by-device basis.

For example, in accordance with some embodiments, a manufacturer may manufacture and sell a smartphone having a fast quad-core processor, having 4 gigabytes of RAM memory, having a camera that is capable of capturing 1080p video at 60 FPS, and having a gyroscope. However, the smartphones may be pre-configured by the manufacturer's such that some of their hardware components are initially disabled, or are initially configured to operate at reduced capacity or with only partial features being operational. For example, the smartphones may be sold by the manufacturer to thousands of consumers, directly or through vendors or retailers or cellular communication providers; and each smartphone may be pre-configured to enable the processor to utilize only one processing core out of the four available processing cores, and/or to enable the smartphone to utilize only 2 gigabytes of memory out of the 4 gigabytes that are available, and/or to enable the camera to capture video at only 720p and at only 30 FPS, and/or with the gyroscope being disabled or deactivated. Such smartphones may be marketed and sold to numerous consumers at an entry-level price or a reduced price, which matches their reduced operational features or their initial configuration.

User Adam purchases the smartphone, and utilizes it in its original configuration. In contrast, User Bob purchases an identical smartphone; and later decides that he would like the processor to utilize all four processing cores, and not only the single processing core that was initially activated by the manufacturer. In accordance with some embodiments, User Bob may access an online destination (e.g., website, web-page, mobile "app" or application", or other service), or may utilize an offline service (e.g., by visiting a point-of-sale), and may pay a one-time fee in order to permanently unlock the ability of the processor of his smartphone to utilize all four processing cores. Similarly, User Claire purchases an identical smartphone; and uses an online mechanism or an offline mechanism in order to upgrade the functionality of the camera for a limited period of time, for example, by paying a monthly fee for a period of three months, such that during those three months the camera in her smartphone will be able to capture 1080p video (instead of the initial configuration of 720p video) at 60 FPS (instead of the initial configuration of 30 FPS). Similarly, User Diana purchases an identical smartphone; and pays a one-time fee or a subscription fee in order to unlock or to activate the gyroscope that is comprised (and is initially disabled or deactivated) in her smartphone, for a limited time-period or for unlimited time.

The Applicants have realized that selective activation or selective configuration of electronic devices, may not be efficiently performed via conventional mechanisms; particularly in a situation in which a first entity is the manufacturer of the device, whereas a second entity is the vendor or the carrier that sells the device and/or supports the device on a regular manner. The Applicants have realized that in a conventional system, that the manufacturing entity loses control over the hardware components of the device once the device leaves its premises; whereas the vendor or the carrier does not have control over those hardware components in a device that another entity (the manufacturer, and not the vendor or the carrier) had manufactured.

Some embodiments may thus enable remote, selective (e.g., on a per-user basis, or a per-device basis), in-field provisioning of electronic devices that have left the physical control of the manufacturer; and/or may enable to selectively provision electronic devices after they left the factory, as an integral part of management of electronic devices and Internet-of-Things (IoT) devices management. For example, a computerized platform or a cloud-based platform may enable to provision devices in the field, and may optionally utilize Lightweight M2M bootstrap operations, first-to-claim mechanism or other device association mechanisms, remote updating of device certificate(s), and/or commissioning using a mobile application or "app". The selective, remote, provisioning or configuration of hardware components of devices may be performed even if the entity which operates the cloud-based platform or the cloud-based management server (or, a similar computerized platform or server which may not necessarily be cloud-based) does not have full control over the devices that it manages; and thus such entity may not be able to directly perform remote provisioning or remote configuration of such managed devices.

The Applicants have realized that in some systems, the involvement of multiple different entities may be required in order to enable remote provisioning or remote configuration of an end-user device; for example, (i) the device manufacturer, (ii) the device vendor or the service provider or the communications carrier, and/or (iii) the entity that operates or manages the computerize or cloud-based management platform for managing IoT or electronic devices. The Applicants have realized that these entities do not necessarily have trust relationship between or among them; and that the remote and selective provisioning process may further need to handle situations in which the ownership in the device changes, as such change may affect feature activation.

The Applicants have realized that remote, selective, feature(s) activation may allow manufacturers to efficiently achieve price segmentation or market segmentation; and/or may allow a manufacturer to charge different customers in a differential manner, exactly what each customer is willing or able to pay and exactly for the (activated) features that are relevant to him. Price segmentation allows a manufacturer to sell or to offer the same product at different price points, irrespective of the cost of production and distribution; thereby decoupling price and quantity, and enabling the manufacturer to sell the same device at a low price to customers interested in basic capabilities and at a premium price to customers willing to pay premium for particular features. Accordingly, a security camera manufacturer may remotely and selectively enable a temperature sensor on the device only for paying customers; a gateway manufacturer may remotely and selectively enable support for particular communication protocols for users that paid for activating the additional features; and such operations may not require to manufacture in advance different product models or product variants.

It is noted that price segmentation has been performed with regard to selective activation of software module, but has not been achieved so far with regard to selective activation of hardware components. For example, in a conventional system, an end-user may download a free trial of a software product, may install it and use it with some features being locked; the user may purchase a registration key or a code that he may enter, causing the software product to unlock one or more advanced features. The Applicants have realized that such selective activation has not been achieved with regard to unlocking or activating hardware components of an already-purchased device; or for modifying (e.g., upgrading, enhancing, increasing) the operational properties of a hardware component (e.g., causing the camera to capture video at 1080p and not only at the initially-configured 720p). Furthermore, remote, selective, feature activation of hardware components may further enable entities to offer a device-as-a-service approach.

In some demonstrative embodiments, feature activation of hardware components of an electronic device may use an activation scheme that utilizes Open Authorization (OAuth) or other token-based authorization and/or authentication schemes; for example, utilizing Authentication and Authorization for Constrained Environments (ACE) using the OAuth 2.0 Framework (ACE-OAuth), to enable delegated access control for constrained devices. The device manufacturer need not have direct access to the device in order to remotely and selectively activate or configure or unlock hardware components therein or operational features of such hardware components; thereby reducing privacy concerns and/or security concerns which may exist when a device manufacturer attempts to independently communicate with an already-sold (and already-delivered) device which is in possession and usage of the end-user. Furthermore, the remote activation may enable a manufacturer in a first country or continent, to securely and efficiently enable or activate hardware features of a device that was already sold and delivered to a user located in a second country or continent.

In a demonstrative system, multiple entities may participate in the feature activation process; for example: (1) the end-user or customer who is in physical possession of the device, and who may typically initiate a transaction to unlock or to activate a previously-locked or previously-disabled hardware feature of his device; (2) the manufacturer of the device, who had manufactured the device such that one or more hardware components therein, or features or capabilities of those components, are initially locked or disabled or deactivated; (3) optionally, a vendor or carrier or service provider (e.g., cellular communication provider, communications service provider), who typically purchases the device from the manufacturer and later sells the device to the end-user, typically while also activating the device or connecting the device to a wireless (and/or wired) communications network; (4) a computerized or cloud-based device management platform operator, who provides and operates a computerize or cloud-based platform that allows end-users to manage and monitor devices that they own.

Reference is made to FIG. 1, which is a schematic block-diagram illustration of a system 100, in accordance with some demonstrative embodiments. System 100 comprises an electronic device 110 having various hardware components, wherein one or more of those hardware components is deactivated or disabled or is not fully operational or is associated with an operational constraint. System 100 also comprise a computerized platform such as cloud-based platform 120 for management of electronic devices. System 100 further comprises a feature activation server 130, for example, owned and/or operated and/or controlled by a manufacturer of the electronic device 110. Optionally, a device management platform 140 may be used, by the end-user of the electronic device 110 or by an entity associated therewith (e.g., an organizational or enterprise administrator), to manage electronic device such as electronic device 110.

For demonstrative purposes, some portions of the discussion, and/or some elements in the drawings, may refer to a "cloud-based platform" or to a "cloud-based account", as non-limiting examples of such platform and account, respectively. However, some implementations may comprise and/or may utilize other types of platforms and/or accounts, which need not necessarily be cloud-based; for example, a local computerized platform implemented via a local (e.g., organizational, enterprise) server computer; a computerized platform implemented via one or more computers or servers which may, but need not necessarily be, remote relative to the managed device, and/or which may not necessarily be managed or operated or controlled by an entity other than the manufacturer and/or other than the vendor/carrier; a device-specific account which need not necessarily be hosted or managed via a cloud-based system, but rather, may be hosted and/or managed via an organizational or enterprise network or system, or by using a direct (or indirect) communication link between the device manufacturer and the device itself, and/or by using a direct (or indirect) communication link between the vendor/carrier and the device itself; and/or other suitable implementations which may be, but need not necessarily be, cloud-based implementations. Accordingly, any reference herein to a "cloud-based" platform or account or feature, may similarly comprise such platform, account or feature which are not necessarily "cloud-based".

In a demonstrative example, the device management platform 140 is utilized to initiate and send a feature activation request (arrow 151) towards the feature activation server 130, requesting to activate or to render fully-operational a particular hardware component of electronic device 110. The activation request indicates which electronic device it pertains to, and which feature(s) are requested to be remotely activated or remotely configured. Optionally, the activation request includes, or is accompanied by, an indication that an activation fee is being paid or has been paid for such activation, or an authorization to collect or to debit the required fee for such activation.

The feature activation server 130 receives the feature activation request, validates and processes it; and in response, sends back (arrow 152) to the device management platform 140 a feature activation Access Token (AT), which is a digital data-item indicating authorization from the device manufacturer to activate or to configure the requested feature. The device management platform 140 sends or forwards or delivers (arrow 153) the feature activation access token to the cloud-based platform 120 for management of electronic device; which, in turn, sends or forwards or delivers (arrow 154) the feature activation access token to the relevant electronic device 110.

The electronic device 110 receives the feature activation access token, validates it, and processes it by performing unlocking operations, configuration operations, and/or activation operations to activate the relevant feature(s) and/or to configure the relevant feature(s). As indicated by arrow 155, the electronic device 110 trusts the feature activation server 130 of the manufacturer and operates based on the received feature activation access token, even though the electronic device 110 is not in direct communication with the feature activation server 130 of the manufacturer, and/or even though the electronic device is typically serviced or supported by vendor/carrier infrastructure 160 (e.g., a cellular communication provider or carrier).

In some implementations, optionally, device management platform 140 need not be implemented as a separate component or as a separate entity from the electronic device 110; but rather, the device management platform 140 may be implemented in the electronic device itself, for example, utilizing a mobile application or "app" or other mechanism (e.g., a website, a web-page, an online interface) to enable the end-user of the electronic device 110 to initiate a request for feature activation.

Figure 2:
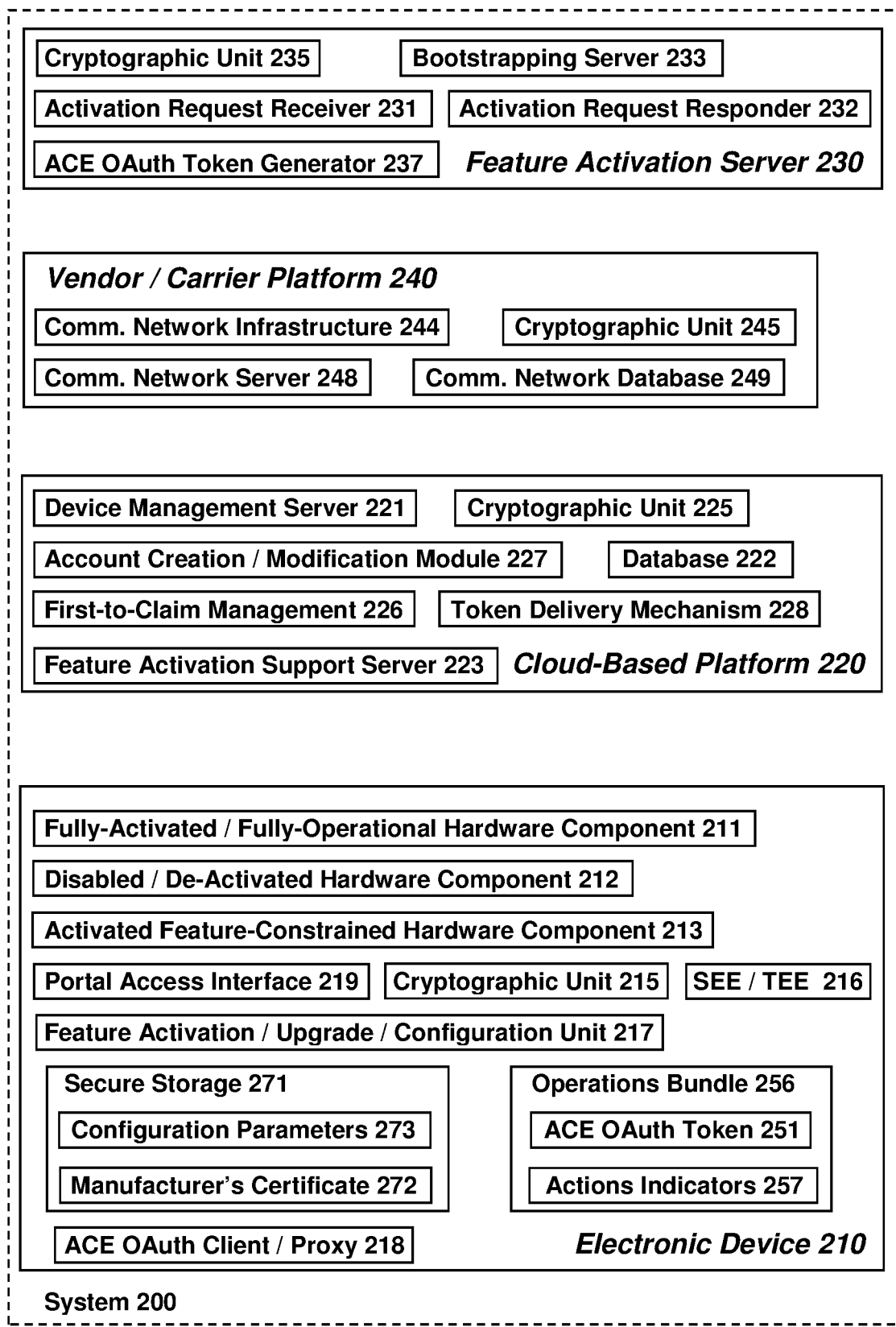
FIG. 2 is a schematic illustration of another system, in accordance with some demonstrative embodiments.

Reference is made to FIG. 2, which is a schematic block-diagram illustration of another system 200, in accordance with some demonstrative embodiments. System 200 comprises an electronic device 210 having various hardware components, wherein one or more of those hardware components is deactivated or disabled or is not fully operational or is associated with an operational constraint. For example, electronic device 210 may comprise: a fully-activated and fully-operational hardware component 211 (e.g., an activated and fully-operational processor); a disabled or deactivated hardware component 212 (e.g., a disabled or deactivated or non-operational gyroscope); and an activated but feature-constrained hardware component 213 (e.g., a camera that is able to capture video at 720p and at 1080p, but was configured by the manufacturer such that the capability to capture video at 720p is activated or enabled, whereas the capability to capture video at 1080p is deactivated or disabled).

System 200 also comprise a computerized platform, such as a cloud-based platform 220, for management of electronic devices. The cloud-based platform 220 may be implemented, for example, using a device management server 221 able to perform device management operations; as well as a local or remote repository or database 222 able to store data pertaining to cloud-based accounts and the respective electronic devices that they relate to. Optionally, the device management server 221 and/or other components of the cloud-based platform 220 may be accessed or controlled via an Application Programming Interface (API), thereby enabling advanced users and/or automated programs to monitor and manage a batch or group of multiple electronic devices.

System 200 further comprises a feature activation server 230, for example, owned and/or operated and/or controlled by a manufacturer of the electronic device 210. The feature activation server 230 may comprise, or may be associated with: a feature activation receiver 231 able to receive an incoming request to activate or upgrade a capability of a hardware component of electronic device 210; and a feature activation responder 232 able to process such request and able to generate and transmit a response to such request, for example, in the form of a digital access token that authorizes and triggers the electronic device 210 to perform the requested activation or upgrade. The feature activation receiver 231 and/or the feature activation responder 232 may perform other operations that are discussed herein with reference to the feature activation server 230.

In a demonstrative example, the manufacturer produces and ships the electronic device with pre-stored manufacturer's certificate stored therein. For example, a manufacturer's certificate 272, such as a cryptographic public key of the manufacturer, is stored in a secure storage 271 within electronic device 210; whereas the cryptographic private key (that corresponds to that cryptographic private key) is securely stored in the feature activation server 230 of the manufacturer. The manufacturer's certificate 272 is later utilized by the electronic device as a feature activation trust anchor.

The electronic device 210 further comprises a portal access interface 219 for accessing the cloud-based platform 220; for example, implemented as a dedicated application or "app" or mobile application or "mobile app", or via a website or web-page (e.g., accessible through a web browser); although initially, upon production or shipping of the electronic device 210, the electronic device is not yet associated with (or assigned to) any particular account on the cloud-based platform 220.

The electronic device 210 is sold or delivered from the manufacturer to a vendor/carrier; which, in turn, sells or delivers the electronic device 210 to the end-user or customer. For example, the vendor/carrier may optionally utilize its vendor/carrier platform 240, which may include its communication network infrastructure 244, such as a communication network server 248 and a communication network database 249, to activate or initialize the electronic device 210, or to register the electronic device 210 in a cellular (or other) communication network, or may optionally insert and/or activate a Subscriber Identification Module (SIM) card in the electronic device 210.

The cloud-based platform 220 and/or the management server 221 further comprise, or are associated with, a cryptographic unit 225 able to perform cryptographic operations, for example, encryption, decryption, hashing, salting, authentication, secure authentication, digital signing, integrity verification, signature verification, generation and/or utilization of private keys and/or public keys, generation of certificate(s), verification of certificate(s), calculating and evaluating checksum(s), generating messages that comprise cryptographic data-items, injecting or inserting or adding cryptographic data-items into message(s), extracting cryptographic data-item from messages, evaluating or verifying or utilizing such cryptographic data-items, generating a pair (or multiple pairs) of private/public keys and using them, generating random or pseudo-random numbers for cryptographic purposes, generating or utilizing prime numbers for cryptographic purposes, and/or other suitable cryptographic operations. Similarly, the feature activation server 230 may comprise a cryptographic unit 235; the communication network server 248 may comprise a cryptographic unit 245; and the electronic device 210 may comprise a cryptographic unit 215.

During or upon, or immediately after, the initial activation of the electronic device 210, as a demonstrative example, a first-to-claim process is performed via a first-to-claim management module 226 at the cloud-based platform 220, or by other account creation/modification module 227 at the cloud-based platform 220, in order to create or assign a computerize account or a device-specific account or a cloud-based account that is uniquely associated with (or assigned to) this particular electronic device 210 by the entity that manages or operates the cloud-based platform 220. This may be performed during a bootstrap process between the vendor/carrier and the manufacturer; by utilizing a bootstrapping server 233 of the manufacturer which the vendor/carrier may access via a particular URL or URI or web-page.

The computerized or cloud-based device-specific account may be assigned to the particular electronic device 210 based on, for example, a pre-defined Device-ID of that particular electronic device 210; by allocating or assigning to that particular electronic device 210 a not-yet-claimed cloud-based account that had been reserved for customers of that particular vendor/carrier by the entity that operates the cloud-based platform 220. In some implementations, an Account Identifier of Account-ID, of the cloud-based account that was assigned to the particular electronic device 210 at the cloud-based platform 220, is known to the communication network server 248 of the vendor/carrier; and optionally, the Account-ID is notified to the feature activation server 230 of the manufacturer in association with the Device-ID of that particular electronic device 210. The device-specific computerized or cloud-based account enables a user of the electronic device 210, or an organizational or enterprise administrator, to monitor and manage the electronic device 210.

Once the electronic device 210 completes the bootstrap process, it begins regular operation and remains associated with the particular cloud-based account that was allocated to it. Optionally, if the electronic device 210 is owned by an organization or enterprise, rather than an individual, then the cloud-based account of the electronic device 210 may be accessed and/or utilized by a representative or administrator of such organization or enterprise, who may similarly manage multiple such electronic devices; for example, through the portal access interface 219 of each such electronic device, and/or through a portal access interface that such administrator may access and utilize via another device (e.g., a web-browser installed on a laptop computer or a desktop computer that is connected to the Internet).

At this stage of regular operation of the electronic device 210, the manufacturer of the electronic device 210 does not have access or control over that electronic device 210; and cannot directly exchange messages with the electronic device 210. Rather, at this stage, it is the vendor/carrier who may directly exchange messages with the electronic device 210, for example, as SMS messages, as Push notifications, via electronic mail, via a dedicated application or "app" that runs on the electronic device 210, or the like.

The electronic device 210 comprises different types of hardware components 211-213, as discussed above. At some point, the user of the electronic device 210, or an organizational administrator associate therewith, may decide that it wishes to request to unlock or activate or fully-activate a hardware component of the electronic device 210 that was so far disabled or that was so far feature-constrained. For example, the user or the administrator may access the cloud-based platform 220, via the electronic device 210 itself or via another apparatus (e.g., a web-based interface via a web-browser in a desktop computer that is connected to the Internet); may log-in to (or may otherwise access) the specific cloud-based account of that electronic device 210; and may selectively choose one or more currently-deactivated hardware components to activate, and/or may selectively choose one or more currently feature-constrained hardware components to be non-feature-constrained or to be less-constrained or to become fully operational. The user or the administrator may pay a one-time fee, or a recurring fee, or a subscription fee, or may authorized payment of such fee, in conjunction with selecting which hardware feature(s) to activate or unlock or upgrade or configure.

Optionally, an administrator or a user may perform such operations in bulk or in batch, for a group or batch or set of electronic devices that belong to that user or to that organization or enterprise; and may manage multiple such electronic devices, as well as their feature activation, in bulk or as a group. For example, the administrator may select via the cloud-based platform 220 to manage in this session all the Android smartphones of the organization; or all the iPhone smartphones of the organization that were purchased in the year 2018; or all the wireless routers of the organization that support IEEE 802.11; or all the smartphones of the organization that comprise a currently-deactivated gyroscope; or all the tablets of the organization that comprise a feature-constrained camera; or other group or subset or list of electronic devices which may be selected, sorted, filtered and/or grouped based on other suitable criteria. Additionally or alternatively, the user or the administrator may visit a point-of-sale or an office of the vendor/carrier, and may submit therein a request to purchase feature activation or feature upgrade, based on a list of device identifiers and/or cloud-based account identifiers, and may perform payment there.

In a demonstrative implementation, the user or the administrator utilizes the portal access interface 219 as described, and then clicks or selects "Upgrade" or "Activate" or other suitable command to initiate the activation or the upgrading of the selected feature(s) of the electronic device 210. For example a web-based application or "app" is loaded into a web-browser in the electronic device, or is otherwise launched or commenced or triggered in the electronic device. The web-based application implements an ACE OAuth client/proxy 218 or similar functionality, together with User Interface (UI) or Graphical User Interface (GUI) to allow feature selection for activation or for upgrading.

An ACE OAuth token 251 is generated by an ACE OAuth Token Generator 237; which may be controlled and operated by the manufacturer. The ACE OAuth token 251 is purchased by the user or administrator of the electronic device 210; is delivered from the manufacturer through the communication network server 248 of the vendor/carrier to the electronic device 210 (e.g., via wireless and/or cellular communication); and may optionally be securely stored in a memory unit or a storage unit or in the secure storage 271 of the electronic device. For example, in some implementations, the ACE OAuth token 251 is stored in stored in a memory unit or a storage unit or in the secure storage 271 of the electronic device; whereas in other implementations, the ACE OAuth token 251 is received at the electronic device 210 which then verifies the authenticity of the ACE OAuth token 251 and (if the authenticity is verified) proceeds to perform the actions that the ACE OAuth token 251 permits but without necessarily also storing a local copy of the ACE OAuth token 251, or together with discarding or deleting the received and already-processed ACE OAuth token 251.

In some implementations, the vendor/carrier does not send to the electronic device 210 only the ACE OAuth token 251; but rather, the vendor/carrier sends to the electronic device 210 an Operation Bundle 256, which includes, for example: the ACE OAuth token 251, and one or more Actions Indicators 257 which indicate to the electronic device what actions the electronic device is permitted (and/or is expected, and/or is required) to perform with regard to that ACE OAuth token 251. The ACE OAuth token 251, and/or the Operation Bundle 256 which comprises the ACE OAuth token 251, may be delivered from the vendor/carrier to the electronic device 210, either directly, or indirectly via the cloud-based platform 220.

It is noted that the manufacturer of the electronic device 210 is not able to directly communicate with the already-sold electronic device 210, and therefore cannot directly perform the feature activation without the involvement of the vendor/carrier; whereas, the vendor/carrier cannot perform the feature activation without the involvement or the pre-involvement of the manufacturer since the electronic device 210 is pre-manufactured to securely store the manufacturer's certificate 272 which the electronic device 210 is hardcoded or pre-configured to utilize as a Trust Anchor for feature activation or feature upgrade, and only the manufacturer (e.g., the feature activation server 230 of the manufacturer) has the cryptographic private key to sign a message that instructs (or permits) the electronic device 210 to activate or to upgrade the operational feature(s) of one or more of its hardware components.

The electronic device 210 needs to ensure that it has received the proper authorization to unlock or activate or upgrade a particular feature of a hardware component; and for this purpose, the ACE OAuth token 251 is utilized by system 200 as a proof-of-possession token. For example, during the process of (or prior to) requesting the feature activation or feature upgrade, a cryptographic public key of the vendor/carrier is delivered to the manufacturer's feature activation server 230. A request for feature activation, which is sent from the vendor/carrier to the manufacturer's feature activation server 230, may be digitally signed by the vendor/carrier using the cryptographic public key of the vendor/carrier. Furthermore, the cryptographic public key of the vendor/carrier is utilized by the ACE OAuth token generator 237 of the manufacturer, to become part of the ACE OAuth token 251 that is digitally signed by the manufacturer using the manufacturer's cryptographic private key.

As part of the validation process of the ACE OAuth token 251 at the electronic device 210, the electronic device 210 verifies that the web-based application possesses the cryptographic public key the vendor/carrier, as a condition for validating the ACE OAuth token 251. This may prevent stealing of the ACE OAuth token 251 and/or its utilization for attack purposes or fraudulent purposes. For example, the ACE OAuth token 251 may comprise the cryptographic public key of the manufacturer (utilized as a Trust Anchor), as well as the cryptographic public key of the vendor/carrier (utilized as a Proof-of-Possession). The ACE OAuth token 251 is digitally signed (by the vendor/carrier, prior to delivering the ACE OAuth token 251 to the electronic device) with the cryptographic private key of the vendor/carrier; and the electronic device 210, which knows or receives the cryptographic public key of the vendor/carrier (e.g., as part of the ACE OAuth token), is thus able to validate the digital signatures.

In some implementations, the request message in which the electronic device 210 requests feature activation or feature upgrade, may comprise an Audience Field or an Audience Indicator, which in indicates the identity of the requesting device; for example, based on its Device-ID and/or based on its Account-ID; in order to reduce the risk of token theft. Optionally, an Operations Bundle 256 may further comprise a nonce (e.g., a unique pseudo-random number), and the electronic device 210 may store the most-recent K nonce values that were used (e.g., the most recent 600 nonce values that were used), to prevent or mitigate a Replay Attack.

The user or administrator of electronic device 210, may utilize the portal access interface 219 or a web-based application to perform the required payment; or, may submit or provide a previously-obtained activation code (e.g., purchased offline at a point-of-sale of the vendor/carrier). The cloud-based platform 220 clears the payment or processes (e.g., validates) the payment authorization; and a token delivery mechanism 228 of the cloud-based platform 220 delivers the ACE OAuth token 251 to the electronic device 210. In some implementations, instead of using a web-based application of the cloud-based platform 220, or in addition to it, a mobile application or "mobile app" may be utilized, to support out-of-band remote provisioning or remote feature activation. In other implementations, a user or an administrator may purchase from a vendor/carrier (e.g., at a point-of-sale of the vendor/carrier), authorization(s) for feature activation(s) for one or more components of an electronic device or for several electronic devices; and accordingly, the vendor/carrier requests and receives one or more ACE OAuth token(s) from the manufacturer, and such ACE OAuth token(s) are then delivered to each respective electronic device via the cloud-based platform 220.

The computerized platform or the cloud-based platform 220 may comprise a Feature Activation Support Server 223 (or, may similarly comprise a feature deactivation support server; or a feature activation-and-deactivation support server; or a feature activation/deactivation support server; or a feature upgrade/downgrade support server), which may perform one or more of the operations described above or herein on behalf of the cloud-based platform; for example, generating and presenting a user interface that enables a user to view current properties or current capabilities of the electronic device 210, as well as features or capabilities or functionalities that the electronic device 210 has but that are deactivated or locked or disabled or that are feature-constrained, and which may be unlocked or activated or upgraded via the cloud-based platform; generating and presenting an interface enabling the user to pay for, or to authorize payment for, or to provide a previous payment confirmation for, such upgrade or activation of a previously-locked feature or a previously-constrained feature; transferring, transmitting, forwarding and/or delivering an activation request or a component capability upgrade request, incoming from the electronic device 210 or from the infrastructure of the vendor/carrier, and/or outgoing to the manufacturer of the electronic device 210 or to the feature activation server 230; transferring, transmitting, forwarding and/or delivering an activation response or a component capability upgrade response, directed towards the electronic device 210 or towards the infrastructure of the vendor/carrier, and/or incoming from the manufacturer of the electronic device 210 or from the feature activation server 230; and/or performing other suitable operations of the cloud-based platform 220.

Once the electronic device 210 receives the ACE OAuth token 251, the electronic device 210 verifies the validity of the ACE OAuth token 251 by checking and validating the digital signature(s) of the ACE OAuth token 251; for example, the ACE OAuth token is signed with the cryptographic public key of the manufacturer and also signed with the cryptographic public key of the vendor/carrier, and the electronic device 210 validates the digital signature(s) prior to acting on the ACE OAuth token 251, by utilizing the pre-stored manufacturer's certificate 272 as a Trust Anchor that was pre-provisioned during the manufacturing of the electronic device 210. Furthermore, if the ACE OAuth token 251 is valid, then the electronic device also checks that the valid ACE OAuth token 251 is indeed directed or addressed to this particular electronic device; for example, by inspecting the Audience Field in the ACE OAuth token 251, and checking that its content matches or includes a Device-ID of this particular electronic device 210. A validated ACE OAuth token 251, that is addressed to this particular electronic device 210 is acted on by the electronic device; whereas, an ACE OAuth token 251 that failed to validate, and/or that is not addressed to this particular electronic device, is discarded or is ignored or is not acted upon by this electronic device 210.

The ACE OAuth token 251, and/or the Operations Bundle 256 which comprises it, may further include a Scope Field which defines the scope of operation(s) that the electronic device should perform (or, should not perform) in response to the ACE OAuth token 251 for the purpose of feature activation or feature upgrade; for example, indicating to the electronic device 210 which bits or parameters or data-items (e.g., particularly, which configuration parameters 273 in the secure storage 271 of device 210) to write, to toggle, or to otherwise modify for the purpose of implementing or deploying the actual activation or upgrade of the relevant feature(s) or component(s) of electronic device 210. According to these indications, a feature activation/upgrade/configuration unit 217 of electronic device 210, which may optionally be implemented within (or as part of) a Secure Execution Environment (SEE) or a Trusted Execution Environment (TEE) (denoted as SEE/TEE 216) of electronic device 210, operates to perform the indicated configuration changes, as authorized by the Operations Bundle 256.

In some implementations, the feature activation or feature upgrade or the required configuration modifications may be performed autonomously or transparently by the electronic device 210, and/or without requesting further or ad-hoc authorization from the end-user of the electronic device 210, and/or without providing advance notification to the end-user of the electronic device 210. In other implementations, such configuration may take effect only upon restarting or "booting" the electronic device 210, and/or may be performed after an additional ad-hoc approval of the end-user to perform the feature activation or feature upgrade.

Optionally, upon performing the feature activation or feature upgrade or the required configuration modifications, the end-user may be notified about the successful changes; or alternatively, in some implementations, a "silent install" mode may be utilized in which no prior notifications and/or subsequent notifications are provided to the end-user.

The successful feature activation or feature upgrade may be followed by closing a feedback loop, such as by informing the carrier/vendor and/or the cloud-based platform 220 that this particular electronic device 210 has succeeded in performing the authorized modifications; thereby also causing an update of the device's profile or properties as they appear in the cloud-based platform 220. The user or an administrator may utilize the cloud-based platform 220 and its device capabilities records or device properties records, to monitor or verify that the particular electronic device 210 was indeed modified as authorized, and that the requested features were successfully activated or upgraded or configured.

For demonstrative purposes, some portions of the discussion may refer to an ACE OAuth token; however, other suitable types of digital tokens or access tokens may be utilized, generated, sent, received, signed, verified, or otherwise handled.

In some implementations, a single access token or a single ACE OAuth token may correspond to, or may indicate, a single modification (e.g., a single activation; a single configuration; a single upgrade) of a single hardware component. In other implementations, a single access token or a single ACE OAuth token may correspond to, or may indicate, two or more modification operations (e.g., two or more activation operations; two or more configuration operations; two or more upgrade operations) of a single hardware component or of two or more hardware components of the same electronic device. For example, a single access token (e.g., particularly when used in conjunction with its Operations Bundle 256) may suffice to indicate to a particular electronic device, that authorization is given to perform (i) activation of a disabled gyroscope, and also (ii) upgrading of the video camera from 720p to 1080p, and also (iii) limited-time upgrading of the video camera from 30 FPS to 60 FPS for a period of two months. Optionally, a Scope Field in the access token or in the Operations Bundle may indicate in a particular manner which actions are authorized and/or required to be performed by the electronic device 210.

Optionally, feature activation or feature upgrade may be purchased for a time-limited period, or using a time-based subscription model. For example, the access token may indicate that the video camera of the electronic device 210 is upgraded from 30 FPS to 60 FPS for a period of only two months. Accordingly, the feature activation/upgrade/configuration unit 217 of electronic device 210, takes note of this time-limit and operates to enforce it; for example, by performing the requested upgrade of the FPS capability of the video camera, while also starting a timer or a task that monitors the passage of time and that triggers a down-grade of the FPS capability when two months elapse from the time of upgrade.

Discussions herein that relate to "feature activation" or "feature upgrade" or "unlocking of features", may similarly apply for the purposes of feature deactivation, feature disabling, feature down-grade, or feature locking, as well as to feature exchange or feature switching. For example, the system may optionally enable a user or an administrator to perform a feature upgrade (e.g., to pay $10 for upgrading the video camera from 30 FPS to 60 FPS for two months); and after one month, to change his mind and to request a feature downgrade (e.g., to downgrade the video camera back from 60 FPS to 30 FPS), optionally while also requesting a partial monetary credit (e.g., of $5) for the unused portion of the time-period. In such situation, system 200 may operate to generate a "feature deactivation" or a "feature downgrade" access token, and to deliver it to the electronic device 210 via the cloud-based platform 220; and the feature activation/upgrade/configuration unit 217 of electronic device 210 may act upon such access token to perform the required down-grade or configuration.

Similarly, a user may request a feature switch or feature exchange or feature swap; for example, initially paying for two months of FPS upgrade of the video camera; and after one month, requesting to downgrade the FPS capability and to replace it with resolution upgrade (e.g., from 720p to 1080p); and the feature activation/upgrade/configuration unit 217 of electronic device 210, may act upon an access token that indicates that such modifications are to be performed. Optionally, an organizational administrator may request feature swap among multiple devices; for example, paying $10 to upgrade the FPS capability of the video camera in the smartphone of User Adam for a period of three months; then, after one month, requesting to perform a swap or a switch, such that the FPS capability of the video camera of the smartphone of User Adam would be downgraded back to its initial capability, and instead, the FPS capability of the video camera of the tablet of User Bob would be upgraded for the remaining two-month period; and in such case, two access tokens may be generated and delivered, a first access token instructing the smartphone of User Adam to down-grade its camera's FPS capability, and a second access token instructing the tablet of User Bob to upgrade its camera's FPS capability for a two-month period. Other suitable modifications may be performed.

In some implementations, feature upgrade or feature activation, with regard to hardware components or the capability of hardware components of electronic devices, may optionally be performed or authorized to be performed by persons other than the immediate end-user of the device.

In a first example, an organization administrator may instruct or trigger the feature activation, via the cloud-based platform, without necessarily being in immediately physical possession of the electronic device to be upgraded, and/or without necessarily being in physical proximity to the electronic device to be upgraded.

In a second example, a parent may purchase a smartphone for her teenage daughter, by paying a reduced price for a smartphone which comprises a camera but is delivered with a disabled camera; and later, once the teenage daughter embarks on a trip, the parent may utilize the cloud-based platform to purchase a feature activation that remotely unlocks the camera in that smartphone, for unlimited time or alternatively for a limited time period (e.g., for one week, or for one month).

In a third example, User Adam knows that his friend User Bob has a feature-constrained smartphone in which the camera is disabled; and User Adam purchases, as a birthday present to User Bob, a prepaid authorization code for unlocking or activating the camera in the smartphone of User Bob. For example, User Adam may visit a point-of-sale of the relevant vendor/carrier; and may pay $20 for a unique authorization code which entitles the bearer to perform one activation of a camera on one smartphone; User Adam gives this authorization code (e.g., similarly to giving a gift card) to User Bob; and User Bob initiates the actual feature activation from his smartphone and/or through his cloud-based account, by entering or scanning the prepaid feature activation authorization code that he received as a gift.

In accordance with some implementations, the feature activation or feature upgrade of a hardware component, or the removal or reducing of constraints from an already-active feature or component, is performed in a selective manner on a per-device basis or on a per-user basis; rather than being performed as a class-wide upgrade that is offered in bulk to all users of a communication carrier that own a certain make-and-model of a device. This is in contrast, for example, to a class-wide firmware upgrade, which is performed in conventional systems over the air to all users (or, to all consenting users) that own a particular make-and-model of a device. Rather, some implementation enable a selective, per-user and/or per-device and/or per feature, upgrade or activation; which enables a first user to initiate and purchase an upgrade of the capability of a first hardware component on his device, while also enabling a second user to initiate and purchase a different upgrade of a different hardware component of his device, and while also enabling a third user to activate a hardware component that was deactivated by the manufacturer of his device, and enabling all the above even though the first user, the second user, and the third user have three respective devices of the same make-and-model that were manufactured by the same manufacturer and are even services by the same communication carrier.

The term "electronic device", as used herein, may comprise any suitable apparatus or device; including, for example, a smartphone, a cellular phone, a tablet, a Personal Digital Assistant (PDA), a hand-held electronic device, a portable electronic device, a mobile electronic device, a laptop computer, a notebook computer, a desktop computer, a non-portable or non-mobile electronic device, a smartwatch, a fitness watch, a wearable device, a Virtual Reality (VR) helmet or headset or glasses or gear or device, an Augmented Reality (AR) helmet or headset or glasses or gear or device, an Internet of Things (IoT) device or appliance or sensor, a "smart home" device or appliance, a "connected home" device or appliance, a device able to send and/or receive data or signals via a cellular communication link and/or via a wireless communication link and/or via IEEE 802.11 ("Wi-Fi") communication link and/or via other communication links or networks, a device having a processor able to execute machine-readable code or instructions or programs, an Internet-connected device or appliance, a router or wireless router, an Access Point (AP), a communications switch, a communications hub, a communications gateway, a printer, a three-dimensional printer or 3D printer, a scanner, a medical device, a smart sensor or an IP-connected sensor, an Internet-connected apparatus (e.g., smoke detector; security camera; vending machine; or the like), a vehicle, a connected vehicle or a smart vehicle, an electric vehicle, an autonomous vehicle, a self-driving vehicle, a drone, an aircraft, an autonomous drone, an autonomous aircraft, and/or other suitable devices.

In some embodiments, an electronic device comprises: a secure storage unit, to securely store a digital certificate pre-installed by a manufacturer of said electronic device; a feature-constrained hardware component, which is one of: (I) a manufacturer-deactivated hardware component, or (II) an activated hardware component having a deactivated operational feature; a feature activation and configuration unit (or, a feature activation/deactivation and configuration unit; or, a feature upgrade/downgrade and configuration unit), (i) to receive, from a source external to the electronic device, a digital access token indicating authorization to perform modification of an operational parameter of said feature-constrained hardware component, and (ii) to validate said digital access token, and (iii) to modify said operational parameter of said feature-constrained hardware component based on a modification scope indicated by said digital access token.

For example, the feature activation and configuration unit is to utilize a cryptographic unit of said electronic device to cryptographically validate said digital access token by validating both (i) a first digital signature applied to said digital access token by said manufacturer, and (ii) a second digital signature applied to said digital access token by a vendor of said electronic device. Additionally or alternatively, the feature activation and configuration unit is to utilize a cryptographic unit of said electronic device to cryptographically validate said digital access token by validating both (i) a first digital signature applied to said digital access token by said manufacturer, and (ii) a second digital signature applied to said digital access token by a vendor of said electronic device; wherein said cryptographic unit of the electronic device utilizes as trust anchor said digital certificate pre-installed by the manufacturer of said electronic device. Optionally, the digital access token comprises an Authentication and Authorization for Constrained Environments (ACE) using OAuth Framework (ACE-OAuth) token; which is configured to further indicate (i) an identification of a particular target audience of said token, and (ii) an identification of a scope of modification that said token authorizes.

The electronic device may further comprise a portal access interface to enable a user of said electronic device to select one or more particular hardware components of said electronic device for which an activation request or a capability-upgrade request are requested. Optionally, a request to activate or to upgrade said feature-constrained hardware component is initiated by an apparatus external to said electronic device by using a device-specific account that is associated with said electronic device. In some implementations, the electronic device is to wirelessly receive said digital access token from an external source; and wherein a request to activate or to upgrade said feature-constrained hardware component is initiated by an apparatus external to said electronic device.

In some implementations, a server apparatus or a server computer apparatus may comprise: an activation request receiver, to receive an incoming request from an electronic device, wherein said incoming request comprises a request to activate or to upgrade a capability of a particular hardware component of said electronic device; an activation responder, to respond to said incoming request by generating a digital access token that authorizes said electronic device to activate or to upgrade said capability of said particular hardware component. Optionally, similar components may receive and handle a deactivation request or a downgrade request.

The activation responder utilizes a cryptographic unit of said server apparatus to digitally sign said digital access token with a cryptographic private key that is securely stored in said server apparatus; wherein a digital certificate that comprises a cryptographic public key, which corresponds to said cryptographic private key, is pre-installed in a secure storage in said electronic device. Additionally or alternatively, the activation request receiver is to receive said incoming request indirectly from said electronic device, via at least one of: (i) a device management server of a computerized platform for managing electronic devices, (ii) a server of a communications carrier that provides communication services to said electronic device. In some implementations, the activation request receiver is to receive said incoming request indirectly from said electronic device, via a device management server of a computerized platform for managing electronic devices; wherein the activation request is digitally signed with a cryptographic public key of a communications carrier that provides communication services to said electronic device.

In some implementations, said digital access token, after being generated and digitally signed by the server apparatus, and prior to delivery of the digital access token to said electronic device, is further digitally signed by a communication carrier that provides communication services to said electronic device. Optionally, said digital access token, upon delivery to said electronic device, triggers said electronic device to activate said particular hardware component which had been deactivated by said manufacturer. In some implementations, said digital access token, upon delivery to said electronic device, triggers said electronic device to perform a modification of a configuration parameter of said particular hardware component, wherein said modification causes an improvement in a previously-constrained capability of said particular hardware component of said electronic device. Optionally, the digital access token comprises an Authentication and Authorization for Constrained Environments (ACE) using OAuth Framework (ACE-OAuth) token, which is configured to further indicate (i) an identification of a particular target audience of said digital access token, and (ii) an identification of a scope of modification that is authorized by said digital access token.

Some embodiments may comprise a system for selectively activating and deactivating capabilities of electronic devices, the system comprising: a device management server, to associate between (i) an identifier of a particular electronic device, and (ii) a device-specific account managed by said device management server; a feature activation/deactivation support server, (i) to receive a request to activate or to deactivate a capability of a particular hardware component of said particular electronic device, (ii) to deliver said request to a feature activation/deactivation server, (iii) to receive from said feature activation/deactivation server a response comprising at least a digital access token that authorizes activation or deactivation of said particular hardware component of said particular electronic device, and (iv) to deliver said digital access token to said particular electronic device; wherein said digital access token triggers said particular electronic device to activate or deactivate said particular hardware component of said particular electronic device. For example, the feature activation/deactivation support server is to generate a user interface that enables a user of said electronic device to request activation or deactivation of said particular hardware component which was previously deactivated or activated, respectively, by the manufacturer of said electronic device; wherein the digital access token, upon delivery by the feature activation support server to said particular electronic device, authorizes and triggers said particular electronic device to perform said activation or deactivation, respectively. Optionally, the feature activation support server (or another suitable component of the system) is to generate a user interface that enables a user of said electronic device to request a time-limited unlocking of a particular feature of said particular hardware component; wherein said particular hardware component was previously activated by the manufacturer of said electronic device in a manner that maintains at least said particular feature locked; wherein the digital access token, upon delivery by the feature activation support server to said particular electronic device, authorizes and triggers said particular electronic device to perform a time-limited unlock of said particular feature of said particular hardware component. In some implementations, at least one of: (i) said request to activate or deactivate, (ii) said digital access token, is exchanged indirectly between said feature activation support server and said electronic device via a cloud-based computerized platform.

Any of the above-mentioned devices, electronic devices, servers, computers, network elements, and/or other apparatuses discussed or described above, may be implemented by using suitable hardware components and/or software components; for example, a processor, a processing core, a Central Processing Unit (CPU), a Digital Signal Processor (DSP), an Integrated Circuit (IC), and Application-Specific Integrate Circuit (ASIC), a memory unit (e.g., Random Access Memory (RAM), Flash memory), a storage unit (e.g., hard disk drive (HDD), solid state drive (SDD), Flash memory), an input unit (keyboard, keypad, mouse, joystick, touch-pad, touch-screen, microphone), an output unit (screen, touch-screen, monitor, audio speakers), a power source (battery, rechargeable battery, power cell, connection to electric outlet), a wireless transceiver, a cellular transceiver, a wired or wireless modem, a network interface card or element, an accelerometer, a gyroscope, a compass unit, a Global Positioning System (GPS) unit, an Operating System (OS), drivers, applications, and/or other suitable components.

In some implementations, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some implementations are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some implementations may utilize a special-purpose machine or a specific-purpose device that is not a generic computer, or may use a non-generic computer or a non-general computer or machine. Such system or device may utilize or may comprise one or more components or units or modules that are not part of a "generic computer" and that are not part of a "general purpose computer", for example, cellular transceiver, cellular transmitter, cellular receiver, GPS unit, location-determining unit, accelerometer(s), gyroscope(s), device-orientation detectors or sensors, device-positioning detectors or sensors, or the like.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some implementations may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some implementations may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some implementations may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A server apparatus, comprising:
an activation request receiver, to receive an incoming request from an electronic device, wherein said incoming request comprises a request to activate or to upgrade a capability of a particular hardware component of said electronic device;
an activation, response generator, to respond to said incoming request by generating a digital access token that authorizes said electronic device to activate or to upgrade said capability of said particular hardware component;
wherein the activation request receiver is to receive said incoming request indirectly from said electronic device, via a device management server of a computerized platform for managing electronic devices;
wherein the activation request is digitally signed with a cryptographic public key of a communications carrier that provides communication services to said electronic device.

2. The server apparatus of claim 1,
wherein said digital access token, after being generated and digitally signed by the server apparatus, and prior to delivery of the digital access token to said electronic device, is further digitally signed by said communication carrier that provides communication services to said electronic device.

3. The server apparatus of claim 1,
wherein said digital access token, upon delivery to said electronic device, triggers said electronic device to activate said particular hardware component.

4. The server apparatus of claim 1,
wherein said digital access token, upon delivery to said electronic device, triggers said electronic device to perform a modification of a configuration parameter of said particular hardware component, wherein said modification causes an improvement in a previously-constrained capability of said particular hardware component of said electronic device.

5. The server apparatus of claim 1,
wherein the digital access token comprises: an Authentication and Authorization for Constrained Environments (ACE) using OAuth Framework (ACE-OAuth) token, which is configured to further indicate (i) an identification of a particular target audience of said digital access token, and (ii) an identification of a scope of modification that is authorized by said digital access token.

* * * * *